United States Patent [19]
Bacso et al.

[11] Patent Number: 5,793,829
[45] Date of Patent: Aug. 11, 1998

[54] PROTECTIVE SLEEVE

[75] Inventors: Douglas Edward Bacso, Cleveland; Michael R. Nemcek, Fairview Park, both of Ohio

[73] Assignee: General Electric Company, Schenectady, N.Y.

[21] Appl. No.: 639,408

[22] Filed: Apr. 29, 1996

[51] Int. Cl.$^6$ .................................................. G21C 11/00
[52] U.S. Cl. ......................... 376/292; 138/109; 285/133.1; 285/417
[58] Field of Search .......................... 376/292, 291, 376/287, 254; 250/515.1; 285/133.1, 149, 292, 417; 138/96 R, 96 T, 109, 147, 157; 403/223; 174/101

[56] References Cited

U.S. PATENT DOCUMENTS

| | | | |
|---|---|---|---|
| 2,736,451 | 2/1956 | Fogg | 138/157 |
| 4,655,483 | 4/1987 | Margotta | 376/292 |
| 4,699,752 | 10/1987 | Brahm et al. | 376/287 |
| 4,781,882 | 11/1988 | Salton et al. | 376/271 |
| 4,917,853 | 4/1990 | Feurgard | 376/292 |
| 4,942,907 | 7/1990 | Joh et al. | 138/157 |
| 5,591,940 | 1/1997 | Basco | 138/109 |

FOREIGN PATENT DOCUMENTS 1357415  6/1974  United Kingdom.

*Primary Examiner*—Daniel D. Wasil
*Attorney, Agent, or Firm*—Armstrong, Teasdale, Schlafly & Davis

[57] ABSTRACT

A protective sleeve includes an outer member and an inner member slidable within the outer member. The outer member has a tubular portion with a first end and a second end, and an attachment assembly is located at the first end of the tubular portion. The outer member further includes a plurality of spring plungers secured to an inner wall of the outer member. The attachment assembly includes a collar and a drip skirt secured to the collar. The attachment assembly is threadedly engaged to the first end of the outer member tubular portion. The inner member includes a first end positioned within the outer member and a second end. At least a portion of the inner member extends from the second end of the outer member. The inner member is movable relative to the outer member. A plurality of spring plungers are secured to an outer wall of the inner member. The spring plungers extend between the outer member and the inner member.

19 Claims, 1 Drawing Sheet

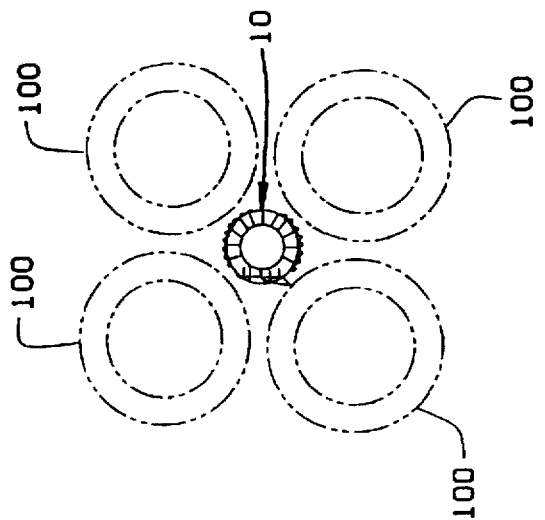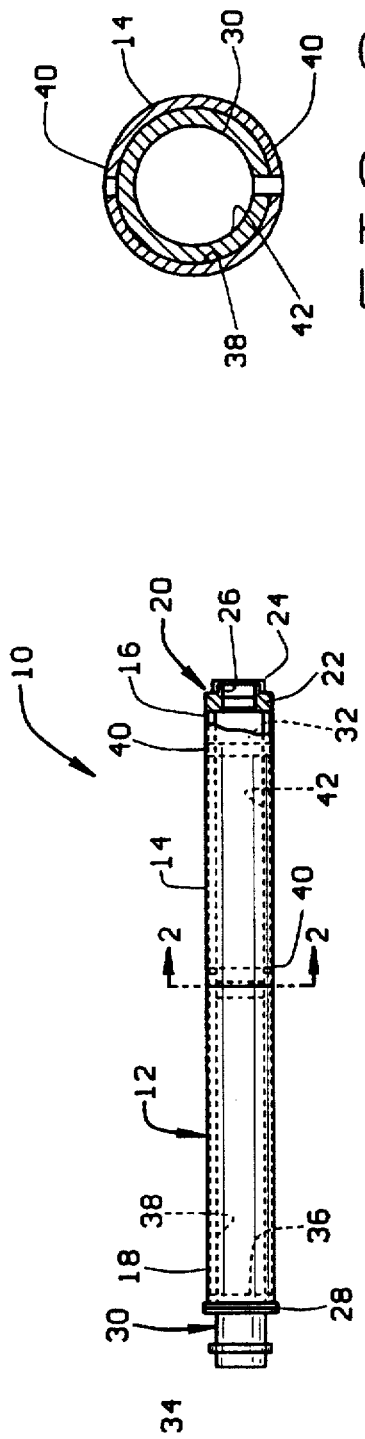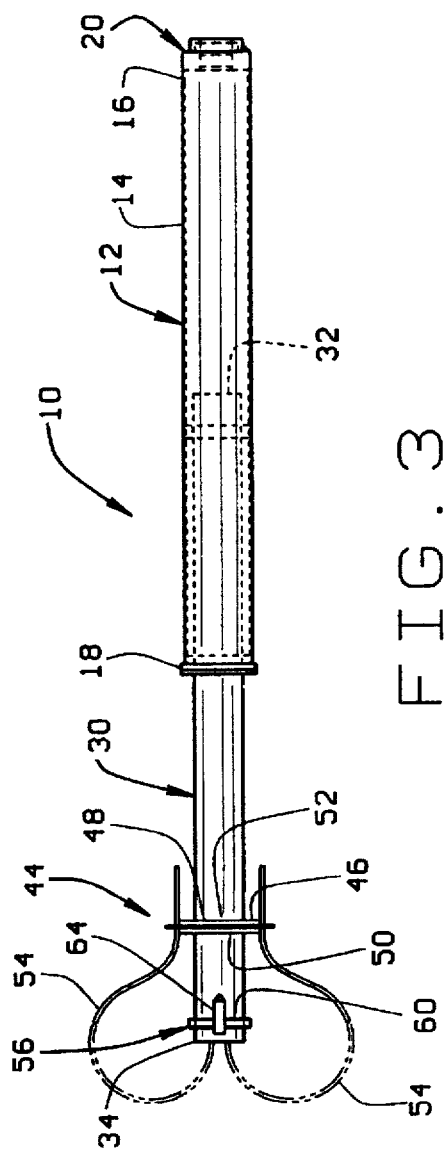

PROTECTIVE SLEEVE

FIELD OF THE INVENTION

This invention relates generally to nuclear reactors and, more particularly, to a protective sleeve for protecting components which extend below the reactor pressure vessel.

BACKGROUND OF THE INVENTION

At the bottom, outer portion of a nuclear reactor pressure vessel, numerous tubular shaped components extend from within the vessel to the region below the vessel. Such components include monitoring equipment and control rod drives. When removing monitoring equipment such as a local power range monitor (LPRM), the LPRM is disengaged from the pressure vessel and then lifted from within the vessel so that the LPRM portion that extends below the vessel is pulled through the vessel opening and up through the vessel.

Control rod drives (CRDs) typically are removed from below the pressure vessel. Specifically, CRDs typically are very large and heavy. Due to the size and weight of such CRDs, the CRDs are lowered from the pressure vessel rather than lifted through the pressure vessel.

When removing a CRD, even slight contact between the CRD and monitoring equipment, e.g., a LPRM, can seriously damage the LPRM, e.g., bend the LPRM. If the LPRM is bent, then the LPRM cannot be pulled through the opening in the vessel for removal. When such damage occurs, the maintenance outage may have to be extended which, of course, is expensive. Therefore, it is desirable to protect the monitoring equipment portions that extend below the reactor pressure vessel from damage that could prevent easy removal of the components.

In providing a protective housing for such components portions that extend below the reactor pressure vessel, however, it must be recognized that the protective housing cannot interfere with maintenance operations that may be required on adjacent components when such maintenance is being performed in the region below the reactor pressure vessel. For example, a component such as an LPRM includes a tubular portion which extends below the reactor pressure vessel. The LPRM tubular portion typically is positioned between four (4) control rod drive (CRD) housings. When performing maintenance operations of the CRD housings, the protective housing for the LPRM preferable will not interfere with, nor prevent, performing maintenance on the CRDs. The protective housing must also be sufficiently rigid to prevent damage to the LPRM.

In addition, and so that maintenance can be performed on the component within the protective housing, the housing preferably provides access to the component. For example, it would be preferable if the component in the housing can be accessed without having to remove the housing for minor servicing and, for more major servicing, it would be preferable if the housing can be removed by one (1) worker within a reasonable time period, e.g., five (5) minutes. In addition to being easy to install and remove, the protective housing also should be light weight.

SUMMARY OF THE INVENTION

These and other objects are attained by a protective sleeve which, in one embodiment, includes an outer member having a tubular portion with a first end and a second end, and an attachment assembly. The attachment assembly is located at the first end of the tubular portion. The attachment assembly includes a collar and a drip skirt secured to the collar. The attachment assembly, in the one embodiment, is threadedly engaged to the first end of the outer member tubular portion.

The protective sleeve also includes, in the one embodiment, an inner member including a first end positioned within the outer member and a second end. At least a portion of the inner member extends from the second end of the outer member. The inner member is movable, e.g., telescoping and rotatable, relative to the outer member.

A plurality of spring plungers are secured to an outer wall of the inner member. The spring plungers extend between the outer member and the inner member. The outer member further includes a plurality of spring plungers secured to an inner wall of the outer member. The spring plungers facilitate maintaining the inner member in alignment with the outer member.

The protective sleeve further includes, in the one embodiment, a cable clamp assembly. The clamp assembly includes a collar having a first portion and a second portion which are hingedly engaged. The collar further includes a latch for maintaining the first and second portions in position, and the collar is sized to be engaged to the inner member at a location external the outer member. The collar includes a plurality of openings so that wires extending through the inner member can be inserted through the openings and held, or clamped, in place.

The above described protective sleeve does not interfere with maintenance operations that may be required on adjacent components. In addition, the protective sleeve can be easily removed so that maintenance can be performed on the components within the protective sleeve. The protective sleeve also is light weight.

BRIEF DESCRIPTION OF THE DRAWINGS

FIG. 1 is a side elevated view of a protective sleeve in accordance with one embodiment of the present invention in a collapsed condition.

FIG. 2 is a cross section view through line 2—2 shown in FIG. 1.

FIG. 3 is a side elevated view of the protective sleeve shown in FIG. 1 in an extended condition.

FIG. 4 is an end view of the sleeve shown in FIG. 1 positioned with respect to other reactor components.

DETAILED DESCRIPTION OF THE DRAWINGS

FIG. 1 is a side elevated view of a protective sleeve 10 in accordance with one embodiment of the present invention in a collapsed condition. Protective sleeve 10 includes an outer tube member 12 including a tubular portion 14 having a first end 16 and a second end 18, and a reactor vessel attachment assembly 20. Reactor vessel attachment assembly 20 is located at first end 16 of tubular portion 14 and includes a metal collar 22 and a rubber drip skirt 24 secured to metal collar 22. Drip skirt 24 is provided to divert water away from the interior of sleeve 10. Attachment assembly 20 is threadedly engaged to first end 16 of outer member tubular portion 14 by a plurality, e.g., three, of screws (not shown) which extend through metal collar 22 and first end 16 of outer member tubular portion 14.

Attachment assembly 20 further includes a threaded bore 26 at least partially extending therethrough. Threaded bore 26 is sized to mate with a hollow threaded bolt which extends from the lower portion of the reactor pressure vessel (not shown). In this manner, protective sleeve 10 can be securely and quickly placed in position.

A cap 28 is threadedly secured to second end 18 of tubular portion 14. Cap 28 is provided so that maintenance operations can be easily be performed on components of protective sleeve 10.

Protective sleeve 10 also includes an inner tube member 30 having a first end 32 positioned within tubular portion 14 and a second end 34. At least a portion of inner tube member 30 extends outward from second end 18 of outer tube member 12. Inner tube member 30 is movable, or slidable, relative to outer tube member 12. In the embodiment shown in FIG. 1, outer tube member tubular portion 14 and inner tube member 30 are substantially cylindrical shaped. Inner tube member 30 has an outer diameter smaller than the inner diameter of outer tube member tubular portion 14.

With respect to the telescoping movement of inner member 30 relative to outer member 12, a plurality of spring plungers 36 are secured to an inner wall 38 of outer member 12. Spring plungers 36 extend between outer member 12 and inner member 30. In addition, a plurality of spring plungers 40 are secured to an outer wall 42 of inner member 30, and spring plungers 40 also extend between outer member 12 and inner member 30. Spring plungers 36 and 40 facilitate maintaining alignment between inner member 30 and outer member 12.

More specifically, FIG. 2 is a cross section view through line 2—2 shown in FIG. 1. As clearly shown in FIG. 2, spring plungers 40 are secured to outer wall 42 of inner member 30, and spring plungers 40 extend between outer member 14 and inner member 30.

FIG. 3 is a side elevated view of protective sleeve 10 in an extended condition. In FIG. 3, a cable clamp assembly 44 is shown secured to inner member 30. Clamp assembly 44 includes a collar 46 having a first portion 48 and a second portion 50. First and second portions 48 and 50 are hingedly engaged. Collar 46 further includes a latch 52 for maintaining first and second portions 48 and 50 in position. Collar 46 is sized to be engaged to inner tube member 30 at a location external outer tube member 12. Collar 46 includes a plurality of openings (not shown) for having wires 54 extend therethrough.

More specifically, second end 34 of inner tube member 30 is open, and a handling tool bracket assembly 56 is mounted to member 30 at second end 34. Assembly 56 includes a ring shaped member 60. Ring member 60 can be captivated by a handling tool to allow an operator to push up or pull down inner member 30. A slot 64 is formed at second end 34 of inner member 30. Slot 64 is provided to accommodate, for example, a travelling incore probe (TIP) which may be housed within sleeve 10.

FIG. 4 is an end view of protective sleeve 10 and illustrates sleeve 10 positioned with respect to other reactor components 100, e.g., control rod drive housings. As shown in FIG. 4, components 100 are positioned around sleeve 10 and there is a limited clearance between each component 100 and sleeve 10.

More specifically, sleeve 10 is threadedly engaged to a hollow bolt which extends downward from the reactor pressure vessel as described above. A portion of a reactor component, such as a local power range monitor (LPRM), a source range monitor (SRM), an intermediate range monitor (IRM), or a travelling incore probe (TIP), extends through the hollow portion of the bolt and into protective sleeve 10. The diameter of inner member 30 is greater than the diameter of the component portion that extends within sleeve 10. Wires 54 from the component extend through sleeve 10 and are then wrapped around end 34 of inner sleeve 30 and are held in place by clamp assembly 44.

During CRD maintenance, for example, sleeve 10 is extended (FIG. 3) so that the monitor component is fully protected within sleeve 10. Once maintenance is complete, sleeve 10 may remain extended. Of course, if maintenance is to be performed on the component within sleeve 10, sleeve 10 can be collapsed (FIG. 1) for minor servicing of the component, or easily and quickly removed from the hollow bolt extending from the reactor pressure vessel, e.g., for more significant servicing.

As explained above, protective sleeve 10 does not interfere with maintenance operations that may be required on adjacent components. In addition, protective sleeve 10 can be easily collapsed or removed so that maintenance can be performed on the components within protective sleeve 10. Protective sleeve 10 also is light weight.

From the preceding description of the present invention, it is evident that the objects of the invention are attained. Although the invention has been described and illustrated in detail, it is to be clearly understood that the same is intended by way of illustration and example only and is not be taken by way of limitation. For example, if the component protected within sleeve 10 has a bend, a slot can be formed along the length of sleeve 10 to accommodate such a bend. Accordingly, the spirit and scope of the invention are to be limited only by the terms of the appended claims.

What is claimed is:

1. A protective sleeve for use in protecting a component which extends downward from and below a lower portion of a reactor vessel of a nuclear reactor, a hollow threaded bolt extending downward from a lower portion of the reactor vessel, said sleeve comprising:

an outer tube member comprising a tubular portion having a first end and a second end;

an inner tube member comprising a first end positioned within said outer tube and a second end, at least a portion of said inner tube extending from said second end of said outer tube, said inner tube member being movable relative to said outer tube member; and a reactor vessel attachment assembly located at and engaged to said first end of said tubular portion, said attachment assembly comprising a threaded bore for mating with the hollow threaded bolt extending downward from the lower portion of the reactor vessel.

2. A protective sleeve in accordance with claim 1 wherein the reactor component has a tubular shape, and said outer tube member tubular portion and said inner tube member are substantially cylindrical shaped, said inner tube member having a diameter smaller than the diameter of said outer tube member tubular portion.

3. A protective sleeve in accordance with claim 1 wherein said attachment assembly comprises a metal collar and a rubber drip skirt secured to said metal collar.

4. A protective sleeve in accordance with claim 3 wherein said attachment assembly is threadedly engaged by a plurality of bolts to said first end of said outer member tubular portion.

5. A protective sleeve in accordance with claim 1 wherein said outer member further comprises a plurality of spring plungers secured to an inner wall of said outer member, said spring plungers extending between said outer member and said inner member.

6. A protective sleeve in accordance with claim 1 wherein said inner member further comprises a plurality of spring plungers secured to an outer wall of said inner member, said spring plungers extending between said outer member and said inner member.

7. A protective sleeve in accordance with claim 1 wherein said outer tube member further comprises a cap threadedly secured to said second end of said tubular portion.

8. A protective sleeve in accordance with claim 1 further comprising a cable clamp assembly, said clamp assembly comprising a collar including a first portion and a second portion, said first and second portions being hingedly engaged, said collar further including a latch for maintaining said first and said second portions in position, said collar sized to be engaged to said inner tube member at a location external said outer tube member.

9. A protective sleeve in accordance with claim 8 wherein said collar further comprises a plurality of openings for having wires extend therethrough.

10. A protective sleeve in accordance with claim 1 wherein said inner tube member further comprises a tubular member having a first end and a second end, said inner tube member further comprising a plurality of spring plungers secured to an outer wall of said inner tube member tubular member, said spring plungers extending between said outer tube member and said inner tube member.

11. A protective sleeve, comprising:

an outer member comprising a tubular portion having a first end and a second end, and an attachment assembly, said attachment assembly located at said first end of said tubular portion, said outer member further comprising a plurality of spring plungers secured to an inner wall of said outer member; and an inner member comprising a first end positioned within said outer member and a second end, at least a portion of said inner member extending from said second end of said outer member, said inner member being movable relative to said outer member, a plurality of spring plungers secured to an outer wall of said inner member, said spring plungers extending between said outer member and said inner member.

12. A protective sleeve in accordance with claim 11 wherein said outer member tubular portion and said inner tube member are substantially cylindrical shaped, said inner member having a diameter smaller than the diameter of said outer member tubular portion.

13. A protective sleeve in accordance with claim 11 wherein said attachment assembly comprises a metal collar and a rubber drip skirt secured to said metal collar, said attachment assembly being threadedly engaged to said first end of said outer member tubular portion.

14. A protective sleeve in accordance with claim 13 wherein said attachment assembly further comprises a threaded bore at least partially extending therethrough.

15. A protective sleeve in accordance with claim 11 further comprising a cable clamp assembly, said clamp assembly comprising a collar including a first portion and a second portion, said first and second portions being hingedly engaged, said collar further including a latch for maintaining said first and said second portions in position, said collar sized to be engaged to said inner member at a location external said outer member.

16. A protective sleeve, comprising:

an outer member comprising a tubular portion having a first end and a second end, and an attachment assembly, said attachment assembly located at said first end of said tubular portion, said outer member further comprising a plurality of spring plungers secured to an inner wall of said outer member, said attachment assembly comprising a collar and a drip skirt secured to said collar, said attachment assembly being threadedly engaged to said first end of said outer member tubular portion;

an inner member comprising a first end positioned within said outer member and a second end, at least a portion of said inner member extending from said second end of said outer member, said inner member being movable relative to said outer member, a plurality of spring plungers secured to an outer wall of said inner member, said spring plungers extending between said outer member and said inner member; and a cable clamp assembly, said clamp assembly comprising a collar including a first portion and a second portion, said first and second portions being hingedly engaged, said collar further including a latch for maintaining said first and said second portions in position, said collar sized to be engaged to said inner member at a location external said outer member.

17. A protective sleeve in accordance with claim 16 wherein said outer member tubular portion and said inner tube member are substantially cylindrical shaped, said inner member having a diameter smaller than the diameter of said outer member tubular portion.

18. A protective sleeve in accordance with claim 16 wherein said attachment assembly further comprises a threaded bore at least partially extending therethrough.

19. A protective sleeve in accordance with claim 16 wherein said collar further comprises a plurality of openings for having wires extend therethrough.

* * * * *